United States Patent
Hack et al.

[11] Patent Number: 5,621,570
[45] Date of Patent: Apr. 15, 1997

[54] MIRROR HOUSING FOR AN EXTERIOR REAR-VIEW MIRROR ON A VEHICLE

[75] Inventors: Albert Hack, Sindelfingen; Rainer Tiefenbacher, Leinfelden-Echterdingen; Roland Borgwardt, Stuttgart; Volker Nickel, Vöhringen; Robert Schwed, Magstadt; Jörg-Uwe Koske, Simmozheim; Richard Merz, Starzach, all of Germany

[73] Assignee: Mercedes-Benz AG, Stuttgart, Germany

[21] Appl. No.: 570,775

[22] Filed: Dec. 12, 1995

[30] Foreign Application Priority Data

Dec. 12, 1994 [DE] Germany ............ 44 44 126.6

[51] Int. Cl.⁶ .................. B60R 1/06; G02B 7/182
[52] U.S. Cl. ................ 359/507; 359/871; 359/879
[58] Field of Search ................ 359/503–509, 359/513–514, 600, 611, 838, 873, 844, 871, 878, 879; 296/154–155, 200; 15/247, 248.1, 250.003, 250.03

[56] References Cited

U.S. PATENT DOCUMENTS

| | | | |
|---|---|---|---|
| 3,598,469 | 8/1971 | Landen | 359/509 |
| 3,938,856 | 2/1976 | Janssen | 296/154 |
| 4,963,011 | 10/1990 | Lu et al. | 359/507 |
| 5,331,461 | 7/1994 | Hwang | 359/507 |
| 5,343,328 | 8/1994 | Chang | 359/507 |

FOREIGN PATENT DOCUMENTS

| | | | |
|---|---|---|---|
| 2551826 | 3/1985 | France | 296/154 |
| 2140393 | 2/1973 | Germany . | |
| 2265036 | 3/1976 | Germany . | |
| 2647747 | 4/1978 | Germany . | |
| 2704226B1 | 8/1978 | Germany . | |

*Primary Examiner*—Thong Nguyen
*Attorney, Agent, or Firm*—Evenson McKeown Edwards & Lenahan, PLLC

[57] ABSTRACT

A mirror housing for an exterior rear-view mirror on a vehicle exhibits a mirror face received in an opening and directed towards the vehicle tail. The mirror housing also exhibits a water channel which runs around the mirror housing adjacent to the opening, which water channel is integrated into the mirror housing opposite the housing surface with side walls sunk in with respect to said housing surface, and by means of which water which impinges in a drive mode is collected before it reaches the opening and is channelled in the direction of the lower housing edge. The mirror housing terminates, between the lower opening border and the water channel, in a strip which is oriented, at an angle with respect to the housing surface, in the direction of the tail and downwards.

11 Claims, 1 Drawing Sheet

MIRROR HOUSING FOR AN EXTERIOR REAR-VIEW MIRROR ON A VEHICLE

BACKGROUND OF THE INVENTION

The invention relates to a mirror housing for an exterior rear-view mirror on a vehicle with a mirror face received in a sunken manner in a mirror housing opening and with a water channel around the housing adjacent the opening.

German Patent Document DE 34 29 493 C1 discloses a mirror housing for an exterior rear-view mirror of a motor vehicle, in which housing there are formed two water-discharging channels arranged one behind the other in the direction of travel. This arrangement of two channels running one behind the other instead of the conventional single channel results in less of the water, which comes into contact with the mirror housing, coming into contact with the side window of the motor vehicle and/or running over the mirror face. However, it is not always possible for a relatively large quantity of water to be received reliably by the two water channels.

U.S. Pat. No. 3,598,469 describes an exterior mirror housing of a motor vehicle, which housing exhibits, on the lower mirror edge, a strip which is oriented in the direction of the tail (vehicle rear end) and downwards. The strip is intended to produce an air swirl, adjoining the mirror face, which is directed along the plane of the latter and draws water way from the mirror face. The air stream, which is charged with the full quantity of impinging water and, on the rear side of the strip, also receives the water drawn away from the mirror face, is subsequently forced upwards again by the relative wind and throws the quantity of water against the adjacent side window.

German Patent Document DE 26 47 747 C3 describes an exterior rear-view mirror for motor vehicles which collects and channels away water in a pointed lip running around it. The pointed lip projects with its outer edge in the direction of the water impinging in driving mode, as a result of which water is swirled up here and can come into contact in an uncontrolled manner both with the mirror face and with the side window of the vehicle. Moreover, the lip can cause the driving noise to increase to a whistle.

The same problems are met in the case of the design of a mirror housing according to German Patent Documents DE 21 40 393 B1 and DE 22 65 036 A1, in which documents the water channel likewise projects from the mirror housing towards the impinging quantity of water and thus makes excess water turbulent rather that channelling it in a controlled manner away from the adjacent side window and from the mirror face. Here, too, an increase in noise can occur in driving mode.

An object of the invention is to design a mirror housing having a water channel of the generic type, such that even a relatively large quantity of impinging water is largely kept away from the adjacent side window.

SUMMARY OF THE INVENTION

This object is achieved according to preferred embodiments of the present invention by providing an arrangement wherein the mirror housing terminates between a lower opening border and the water channel in a strip which is oriented at an angle with respect to the housing surface in the direction of the vehicle rear end.

The strip which is oriented at an angle with respect to the housing surface in the direction of the tail or rear vehicle end and downwards, and located between the opening border and the water channel, discharges the outflowing water downwards and further in the direction of the tail, assisted by the air stream deflected around it, with the result that swirling water produced at the lower housing edge cannot any longer come into contact with the side window or with the mirror face of the exterior rear-view mirror, as a result of which these are also prevented from being soiled by dirty water.

If the strip adjoins the side wall of the water channel with a smooth-surface transition according to certain preferred embodiments, then turbulence is also avoided as a result. In this arrangement, it is also contemplated by the invention to permit the strip to be oriented downwards with a steep gradient by means of a pronounced angled-off portion, as a result of which the lower housing edge is likewise positioned downwards to a great extent, away from the side window. The outflowing water is kept away from the mirror face by the free end of the strip extending beyond the mirror face, in the direction of the tail. The flow noises on the exterior rear-view mirror are kept low by the radius of the free end of the strip.

Other objects, advantages and novel features of the present invention will become apparent from the following detailed description of the invention when considered in conjunction with the accompanying drawings.

DETAILED DESCRIPTION OF THE DRAWINGS

Figure 1:
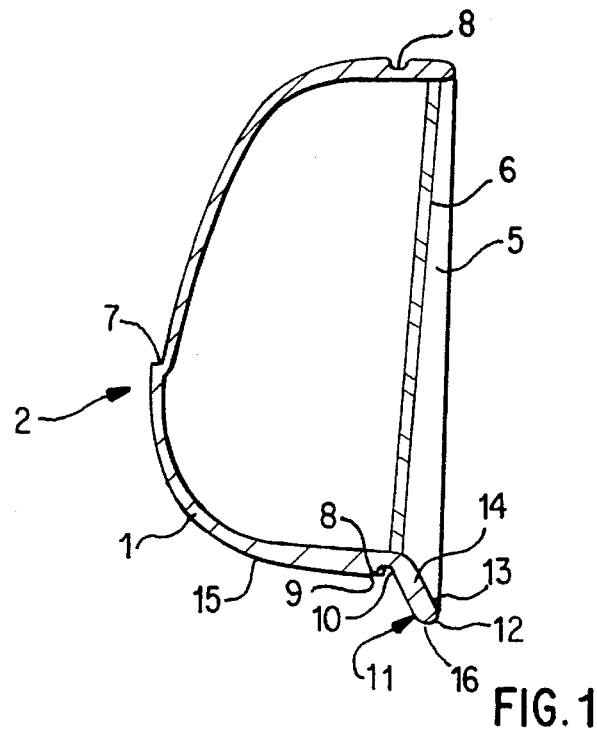
FIG. 1 shows a cross-section through a mirror housing constructed according to a preferred embodiment of the invention, taken along the plane I—I in FIG. 2.
Figure 2:
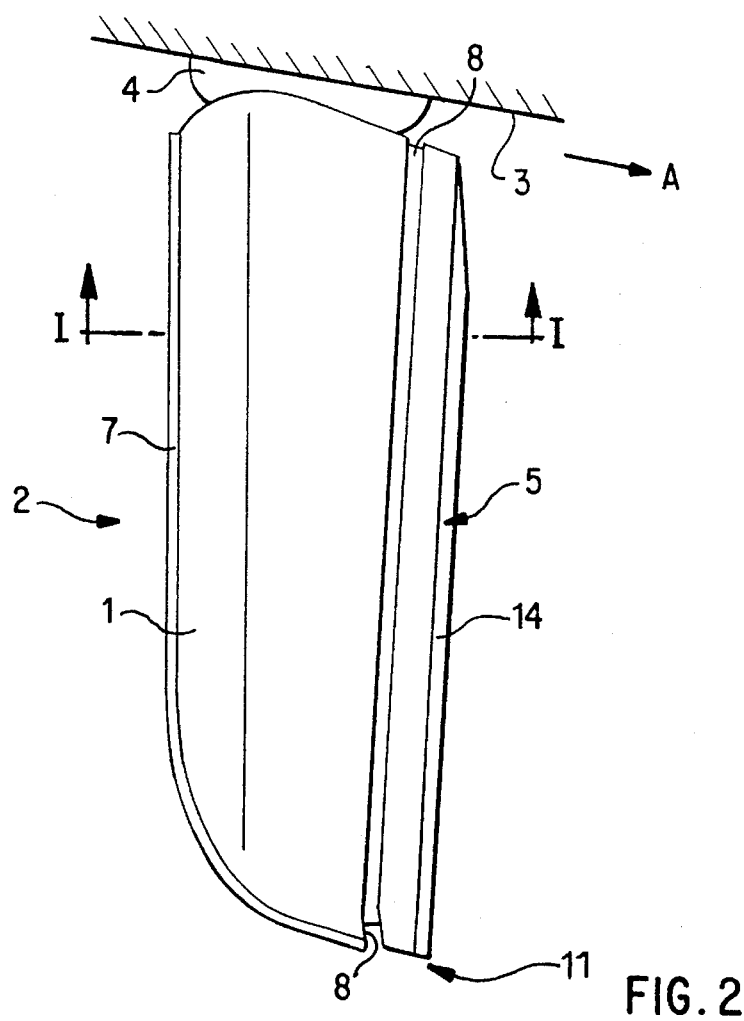
FIG. 2 shows a plan view of the mirror housing on a side of a vehicle.

The mirror housing 1 of an exterior rear-view mirror 2 is fixed, in FIGS. 1 and 2, on a side 3, represented only as an edge, of a vehicle via a bracket 4. A large-surface-area opening 5 of the mirror housing 1 receives a mirror face 6 which is directed towards the vehicle tail (tail direction= arrow A) and in which a vehicle occupant can see vehicles approaching from the rear. The rain water or spray which comes into contact with the mirror housing 1 in driving mode is deflected, due to the convex form of the mirror housing 1 and additionally due to an offset 7 running along the front approximately half way up the housing, into a water channel 8 adjacent to the opening 5. The water channel 8 is integrated into the mirror housing 1 with sunken side walls 9 and 10 and extends around the mirror housing 1. By means of the arrangement and form of the water channel, the water is channelled downwards and, for the most part, into the lower corner 11 which is furthest away from the side 3 of the vehicle. This avoids the situation where water enters the opening 5 and thus soils the mirror face 6.

In order to ensure that even in the case of a relatively large quantity of water and in the case of said relatively large quantity of water, where the water running off the lower housing edge 12 passes, in a swirled-up state, onto the side window in the upper part of the side 3 of the vehicle, as a result of which said window could be soiled to such an extent that it would be difficult to see through it freely, the mirror housing 1 terminates in a strip 14 between the lower opening border 13 and the water channel. Strip 14 is oriented at an angle with respect to the adjoining housing surface 15, in the direction of the tail (arrow A) and downwards, towards the carriageway. The alignment of the strip 14, assisted by the air stream deflected around it, means that the water is channelled further downwards and in the direction of the tail (arrow A), as a result of which the situation where the mirror face 6 and the adjacent side 3 of the vehicle are soiled is avoided.

Since the strip 14, which is oriented downwards with a steep gradient and in the direction of the tail (arrow A), adjoins the side wall 10 of the water channel 8 with a smooth-surface transition, the water is deflected here downwards and rearwards to a great extent without any major turbulence on the vehicle. The strip end 16 along the bottom border of the opening 5 protrudes rearwardly of the top and side border of the opening. Furthermore, the free end 16 of the strip 14 projects beyond the mirror face 6, in the direction of the tail (arrow), and thus channels the water away from said mirror face, and is, in addition, of a rounded design, as a result of which the noise of water flowing around it is minimized.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Mirror housing for an exterior rear-view mirror on a vehicle, adjacent to a side window and having a mirror face received in a sunken manner in an opening and directed towards a vehicle rear end, and having a water channel which extends around the mirror housing adjacent to the opening and is integrated into the mirror housing opposite housing surface, with side walls sunk in respect to said housing surface, and by means of which water which impinges in a forward direction driving mode is collected before it reaches the opening and is channelled in the direction of a lower housing edge, which projects beyond the mirror face, in a direction of a vehicle rear end, wherein the mirror housing terminates between a lower opening border and the water channel in a strip which is oriented at an angle with respect to the housing surface in the direction of the vehicle rear end and downwards.

2. Mirror housing according to claim 1, wherein the strip adjoins the side wall of the water channel, and wherein the transition from the side wall to the strip is designed to have a smooth surface.

3. Mirror housing according to claim 1, wherein a free end of the strip is of a rounded design.

4. A rear view mirror assembly for a passenger car, comprising:
a mirror housing,
and a mirror face plate disposed in an opening in said mirror housing,
wherein said mirror housing includes a water channel extending around the mirror housing adjacent the opening,
and wherein said housing is provided with a strip disposed under a bottom border of said opening and under a bottom section of the water channel, said strip extending at an angle downwardly and toward a rear vehicle end when said mirror housing is in an in-use position outside of and adjacent a side window of a passenger car, whereby rain water impinging on a front side of the housing during driving of said passenger car is deflected away from the mirror face plate and the vehicle side window to prevent water soiling of the mirror face plate and the vehicle side window.

5. A rear view mirror assembly according to claim 4, comprising a mounting bracket attached to the mirror housing.

6. A rear view mirror assembly according to claim 4, wherein said mirror housing opening is configured to hold said mirror face plate in a sunken manner at locations disposed forwardly of rearmost border portions of said mirror housing when said mirror housing is in an in-use position on a passenger car.

7. A rear view mirror assembly according to claim 6, comprising a mounting bracket attached to the mirror housing.

8. A rear view mirror assembly according to claim 7, wherein said strip along the bottom border of the opening protrudes rearwardly of top and side borders of the opening.

9. A rear view mirror assembly according to claim 8, wherein a free lower and rearward most end of the strip has a rounded smooth surface.

10. A rear view mirror assembly according to claim 4, wherein said strip along the bottom border of the opening protrudes rearwardly of top and side borders of the opening.

11. A rear view mirror assembly according to claim 4, wherein a free lower and rearward most end of the strip has a rounded smooth surface.

* * * * *